No. 787,768. Patented April 18, 1905.

UNITED STATES PATENT OFFICE.

PAUL JULIUS AND ERNST FUSSENEGGER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

BLUE-RED AZO DYE.

SPECIFICATION forming part of Letters Patent No. 787,768, dated April 18, 1905.

Application filed November 16, 1904. Serial No. 233,027. (Specimens.)

*To all whom it may concern:*

Be it known that we, PAUL JULIUS and ERNST FUSSENEGGER, doctors of philosophy and chemists, subjects of the Emperor of Austria-Hungary, residing at Ludwigshafen-on-the-Rhine, in the Kingdom of Bavaria, German Empire, have invented new and useful Improvements in Azo Coloring-Matter, of which the following is a specification.

This invention relates to the production of azo coloring-matter.

We have discovered that a new and valuable azo coloring-matter, which in the form of its lakes is characterized by excellent fastness against the action of light, can be obtained by combining diazotized 3.4-dichlor-anilin with beta-naphthol-disulfo-acid R. The 3.4-dichlor-anilin which is used in carrying out our invention can be obtained by the method given by Beilstein and Kurbatow, (*Annalen*, 196, p. 216.)

The following example will serve to further illustrate the nature of our invention, which, however, is not confined to this example, (the parts being by weight:)

Diazotize one hundred and sixty-two (162) parts of 3.4-dichlor-anilin in the usual manner and allow the solution containing the easily-soluble diazo compound to run (while stirring) into a solution of three hundred and fifty (350) parts of the sodium salt of beta-naphthol-disulfo-acid R, adding sufficient sodium carbonate to keep the whole alkaline. Stir for half an hour, warm to a temperature of fifty degrees centigrade, (50° C.,) salt out the coloring-matter by means of common salt, and filter it off and press it.

The new coloring-matter consists of a red powder and is soluble in water. It is especially applicable to the production of lakes, its barium-aluminum lake being bluish red. When dyed on animal fiber it produces orange-red shades. Upon reduction with tin and hydrochloric acid it yields 3.4-dichlor-anilin and amido-naphthol-disulfo-acid.

What we claim is—

As a new article of manufacture, the azo coloring-matter which can be obtained by combining diazotized 3.4-dichlor-anilin with beta-naphthol-disulfo-acid R, which coloring-matter is soluble in water, which in the form of its barium-aluminum lake possesses a bluish-red color, and which on reduction with tin and hydrochloric acid yields 3.4-dichlor-anilin and amido-naphthol-disulfo-acid.

In testimony whereof we have hereunto set our hands in the presence of two subscribing witnesses.

PAUL JULIUS.
ERNST FUSSENEGGER.

Witnesses:
ERNEST F. EHRHARDT,
J. ALEC. LLOYD.